United States Patent
Lin

(10) Patent No.: US 6,394,692 B1
(45) Date of Patent: May 28, 2002

(54) BICYCLE HEAD LOCK RING ASSEMBLY

(76) Inventor: Wen-Hwa Lin, No. 816, Chang Shen Rd., Tian San Chun, Wei Pu Hsiang, Taichung Hsien (TW)

(*) Notice: Subject to any disclaimer, the term of this patent is extended or adjusted under 35 U.S.C. 154(b) by 0 days.

(21) Appl. No.: 09/559,598

(22) Filed: Apr. 28, 2000

(51) Int. Cl.$^7$ ................................ B62K 21/18
(52) U.S. Cl. .................. 403/371; 74/531; 384/545; 384/538; 280/279
(58) Field of Search ................ 403/205, 353, 403/371; 74/531; 384/545, 538; 280/279, 280

(56) References Cited

U.S. PATENT DOCUMENTS

| | | | |
|---|---|---|---|
| 5,678,836 A | * 10/1997 | Chen | 280/280 |
| 5,681,119 A | * 10/1997 | Marur | 280/279 X |
| 5,971,415 A | * 10/1999 | Lin | 280/280 |
| 6,231,063 B1 | * 5/2001 | Chi | 280/279 |

* cited by examiner

Primary Examiner—Lynne H. Browne
Assistant Examiner—John R. Cottingham
(74) Attorney, Agent, or Firm—Varndell & Varndell, PLLC

(57) ABSTRACT

A head lock ring assembly includes a ball bearing mounted on the head tube of a bicycle at a top and holding a set of steel balls outside the head tube, and a cover shell assembly formed of a cover shell, a first split ring, a second split ring, a rubber ring, and a locating cap, the cover shell assembly being covered on the ball bearing to lock the handlebar stem and the front fork of the bicycle for enabling the handlebar stem and the front fork to be rotated relative to the head tube, wherein the locating cap has a bottom flange inserted into the cover shell to hold down the first split ring and the second split ring in a receiving chamber in the cover shell around the handlebar stem and the front fork; the rubber ring is mounted around the locating cap above the bottom flange, and peripherally partially engaged into an inside annular groove in the cover shell to secure the cover shell, the first split ring, the second split ring and the locating cap together for quick installation.

1 Claim, 5 Drawing Sheets

BICYCLE HEAD LOCK RING ASSEMBLY

BACKGROUND AND SUMMARY OF THE INVENTION

The present invention relates to a bicycle head lock ring assembly, and more particularly to a reliable head lock ring assembly, which can easily quickly be installed in the head tube of a bicycle frame to lock the handlebar stem of the handlebar of a bicycle frame to lock the handlebar stem of the handlebar and front fork of the bicycle for enabling the handlebar stem and the front fork to be rotated relative to the head tube.

The head lock ring assembly of a regular bicycle, as illustrated in FIGS. 1 and 2, is comprised of a ball bearing holding a set of steel balls, a cover shell covered on the ball bearing, a first tapered bushing, a second tapered bushing, and a locking cap. During installation, the ball bearing is sleeved onto the front fork, and then the cover shell is covered on the ball bearing, and then the first tapered bushing and the second tapered bushing are inserted into a hole in the cover shell and arranged together, and then the locating cap is fastened to the cover shell to hold down the first tapered bushing and the second tapered bushing. The installation procedure of this structure of head lock ring assembly is complicated. During installation, the first tapered bushing and the second tapered bushing tend to be tilted relative to each other, and the worker must carefully correct the position of the first tapered bushing and the second tapered bushing. Further, after installation of the head lock ring assembly, the handlebar stem holds down the locating cap. However, because the head lock ring assembly has none "self-fixing" function, it becomes unstable if the lock screw of the handlebar stem is loosened (see also FIG. 3).

The present invention provides a head lock ring assembly, which eliminates the aforesaid drawbacks. According to the present invention, the head lock ring assembly is comprised of a ball bearing and a cover shell assembly covered on the ball bearing. The cover shell assembly is comprised of a cover shell, a first split ring, a second split ring, a rubber ring, and a locating cap, and covered on the ball bearing to lock the handlebar stem and the front fork of the bicycle for enabling the handlebar stem and the front fork to be rotated relative to the head tube. The locating cap is coupled to the cover shell to hold down the first split ring and the second split ring. The rubber ring is mounted around the locating cap and peripherally partially engaged into an inside annular groove in the cover shell to secure the cover shell, the first split ring, the second split ring and the locating cap together for quick installation.

DETAILED DESCRIPTION OF THE PREFERRED EMBODIMENT

Figure 1:
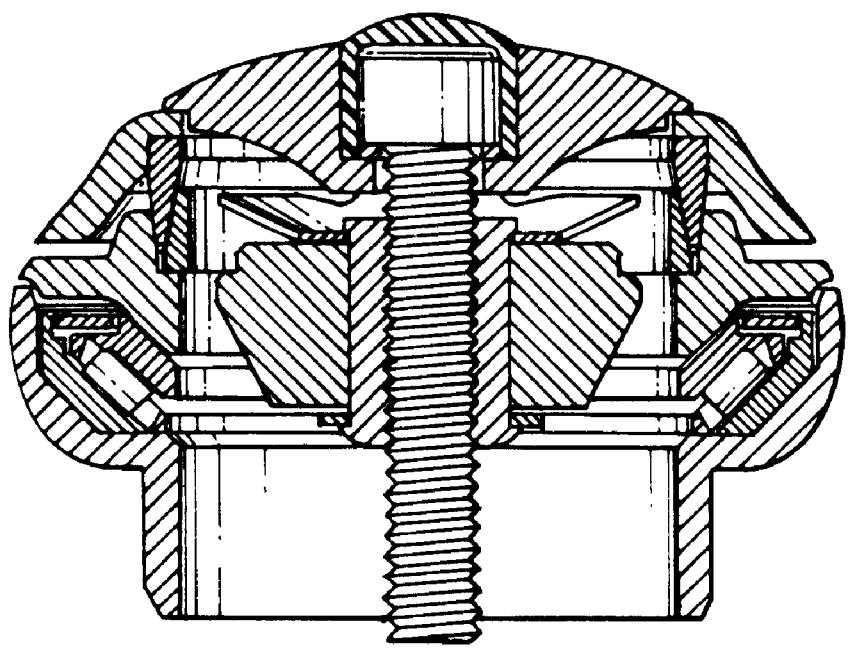
FIG. 1 is a sectional assembly view of a bicycle head lock ring assembly according to the prior art.
Figure 2:
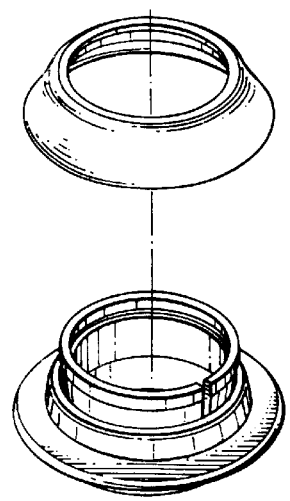
FIG. 2 is an exploded view of a part of the bicycle head lock ring assembly according to the prior art.
Figure 3:
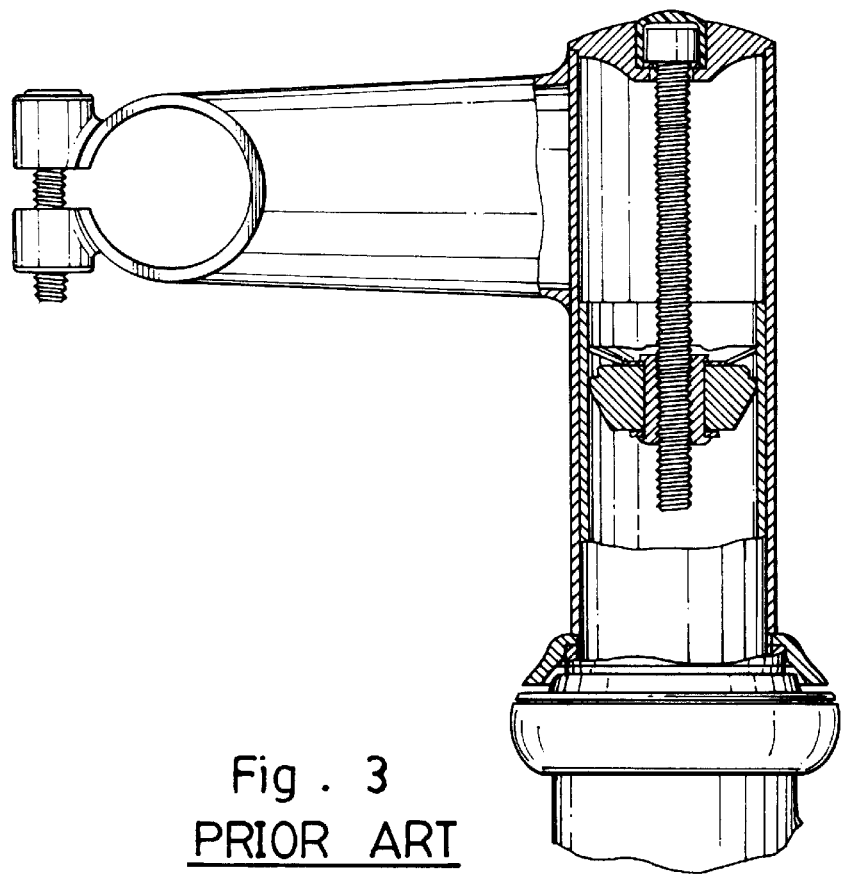
FIG. 3 is a sectional view showing the bicycle head lock ring assembly installed in the frame of a bicycle according to the prior art.
Figure 4:
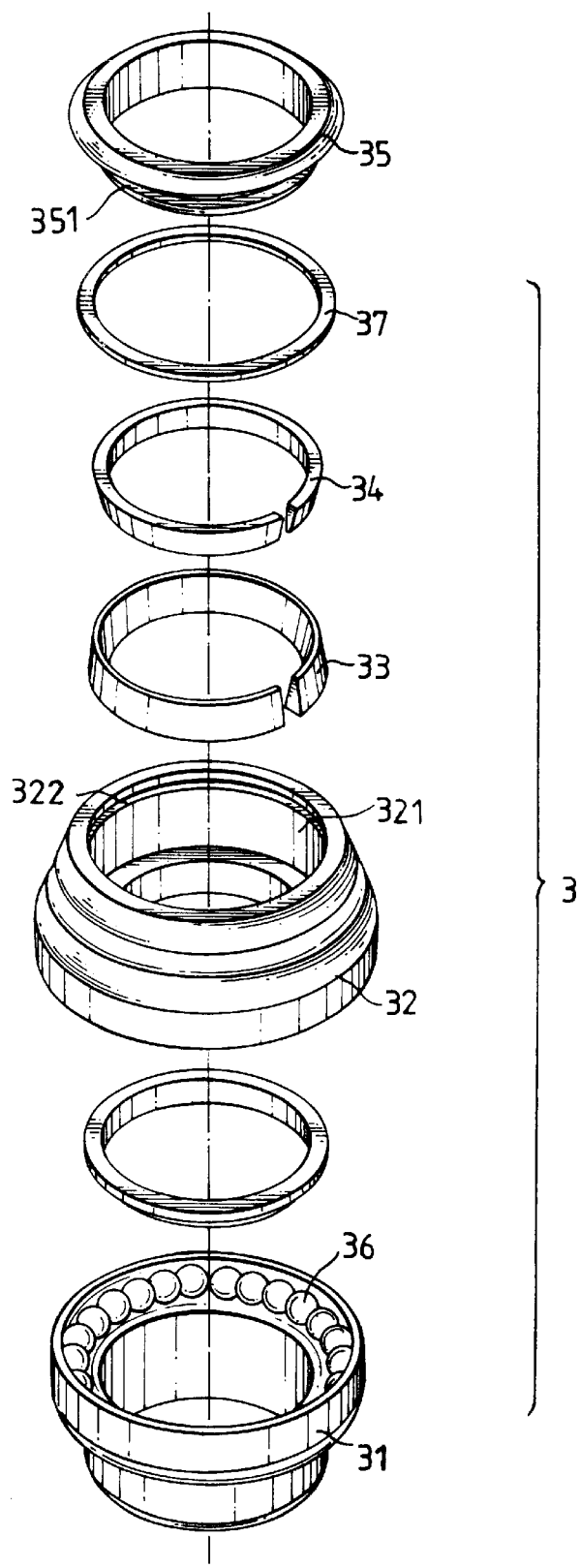
FIG. 4 is an exploded view of a bicycle head lock ring assembly according to the present invention.
Figure 5:
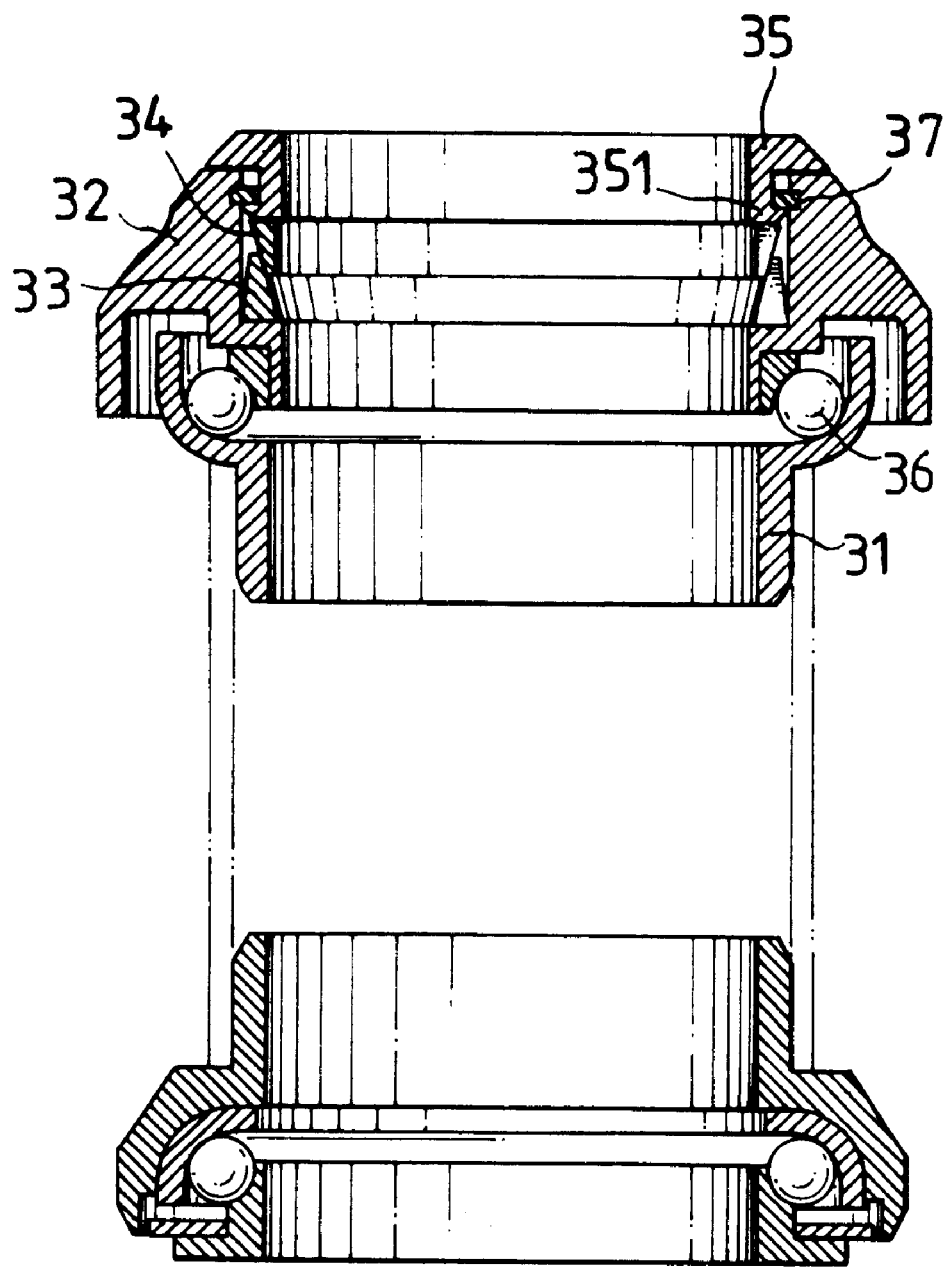
FIG. 5 is a sectional view showing the bicycle head lock ring assembly assembled according to the present invention.
Figure 6:
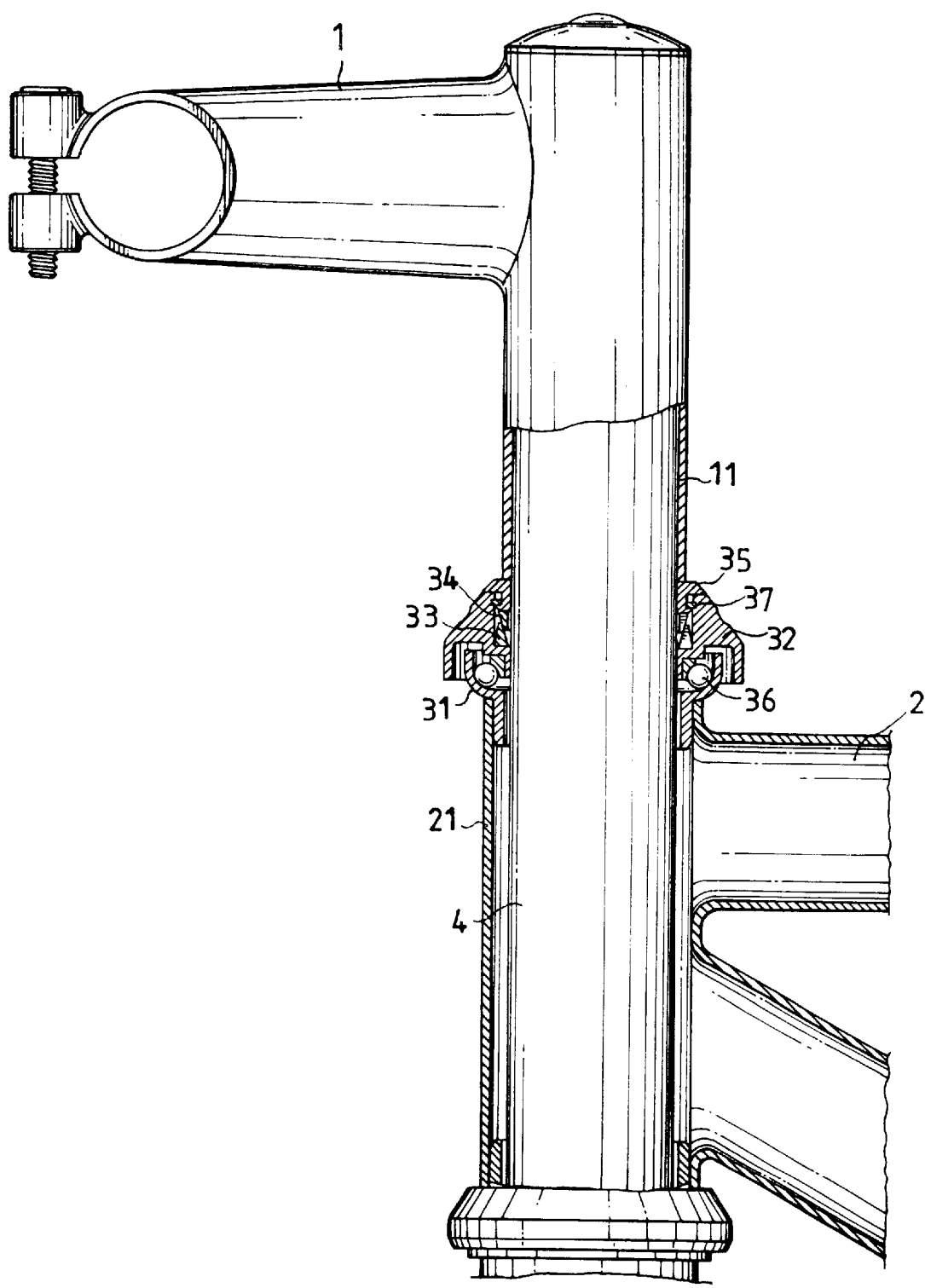
FIG. 6 illustrates the bicycle head lock ring assembly installed in the frame of a bicycle according to the present invention.

Referring to FIGS. from 4 through 6, a bicycle head lock ring assembly 3 is mounted on the head tube 21 of a bicycle frame 2 to lock the handlebar stem 11 of the handlebar 1 and the front fork 4, enabling the handlebar stem 11 and the front fork 4 to be rotated relative to the head tube 21. The head lock ring assembly 3 is comprised of a ball bearing 31 mounted on the head tube 21 at the top and holding a set of steel balls 36 outside the head tube 21, a hollow cover shell 32 covered on the ball bearing 31 around the handlebar stem 11, a first split ring 33, a second split ring 34, a locating cap 35 fastened to the cover shell 32 to hold down the first split ring 33 and the second split ring 34 in the cover shell 32 around the handlebar stem 11, and a rubber ring 37 sealed in between the cover shell 32 and the locating cap 35.

The cover shell 32 comprises a receiving chamber 321, which holds the first split ring 33 and the second split ring 34, and an inside annular groove 322, which holds the rubber ring 37 in the receiving chamber 321 at a top side. The locating cap 35 comprises a bottom flange 351 inserted into the receiving chamber 321 in the cover shell 32 to hold down the first split ring 33 and the second split ring 34. The rubber ring 37 is mounted around the locating cap 35 above the bottom flanged 351, and peripherally partially engaged into the inside annular groove 322 in the cover shell 32 to secure the cover shell 32, the first split ring 33, the second split ring 34 and the locating cap 35 together. During installation, the cover shell 32, the first split ring 33, the second split ring 34, the rubber ring 37 and the locating cap 35 are assembled together, forming a cover shell assembly. The cover shell assembly is then covered on the ball bearing 31 to hold the handlebar stem 11 and the front fork 4 together, enabling the handlebar stem 11 and the front fork 4 to be rotated relative to the head tube 21.

While only one embodiment of the present invention has been shown and described, it will be understood that various modifications and changes could be made thereunto without departing from the spirit and scope of the invention disclosed.

What is claimed is:

1. A head lock ring assembly mounted on a head tube of a bicycle frame to lock a handlebar stem of a handlebar and front fork of the bicycle for enabling said handlebar stem and said front fork to be rotated relative to said head tube, the head lock ring assembly comprising a ball bearing mounted on said head tube at a top and holding a set of steel balls outside said head tube, a hollow cover shell covered on said ball bearing around said handlebar stem; a first split ring, a second split ring, a locating cap fastened to said cover shell to hold down said first split ring and said second split ring in said cover shell around said handlebar stem, and a rubber ring sealed in between said cover shell and said locating cap, wherein said cover shell comprises a receiving chamber, which holds said first split ring and said second split ring, and an inside annular groove, which holds said rubber ring in said receiving chamber at a top side; said locating cap comprises a bottom flange inserted into said receiving chamber in said cover shell to hold down said first split ring and said second split ring; said rubber ring is mounted around said locating cap above said bottom flange, and peripherally partially engaged into said inside annular groove in said cover shell to secure said cover shell, said first split ring, said second split ring and said locating cap together.

* * * * *